US012651084B2

(12) United States Patent
Wilczynski

(10) Patent No.: US 12,651,084 B2
(45) Date of Patent: Jun. 9, 2026

(54) SYSTEMS AND METHODS FOR GENERATING CONTEXT-AWARE PAGERANKS

(71) Applicant: Palantir Technologies Inc., Denver, CO (US)

(72) Inventor: Peter Wilczynski, Denver, CO (US)

(73) Assignee: Palantir Technologies Inc., Aventura, FL (US)

( * ) Notice: Subject to any disclaimer, the term of this patent is extended or adjusted under 35 U.S.C. 154(b) by 269 days.

(21) Appl. No.: 18/111,152

(22) Filed: Feb. 17, 2023

(65) Prior Publication Data

US 2023/0274021 A1      Aug. 31, 2023

Related U.S. Application Data

(60) Provisional application No. 63/314,667, filed on Feb. 28, 2022.

(51) Int. Cl.
*G06F 21/62* (2013.01)
*G06F 16/2457* (2019.01)
*G06F 16/953* (2019.01)

(52) U.S. Cl.
CPC .... *G06F 21/6227* (2013.01); *G06F 16/24578* (2019.01); *G06F 16/953* (2019.01)

(58) Field of Classification Search
CPC ............... G06F 21/6227; G06F 16/953; G06F 16/24578
USPC ......................................................... 726/28
See application file for complete search history.

(56) References Cited

U.S. PATENT DOCUMENTS

| | | | | |
|---|---|---|---|---|
| 9,098,582 | B1 * | 8/2015 | Bass ..................... | G06F 16/951 |
| 9,477,844 | B2 * | 10/2016 | Adams ................ | G06F 21/6218 |
| 2008/0010281 | A1 * | 1/2008 | Berkhin ................ | G06F 16/951 |
| 2020/0004885 | A1 * | 1/2020 | Bastide ................. | G06F 16/248 |
| 2020/0097560 | A1 * | 3/2020 | Kulkarni .......... | G06F 16/24578 |

FOREIGN PATENT DOCUMENTS

CN          112329473 A  *  2/2021  ............. G06Q 50/01

OTHER PUBLICATIONS

Haveliwala "Topic-Sensitive PageRank: A Context-Sensitive Ranking Algorithm for Web Search" Aug. 2003 (Year: 2003).*
PageRank page at Wikipedia, last edited on Nov. 1, 2021.

* cited by examiner

*Primary Examiner* — Michael R Vaughan
*Assistant Examiner* — Saad Ahmad Abdullah
(74) *Attorney, Agent, or Firm* — Faegre Drinker Biddle & Reath LLP

(57) ABSTRACT

System and method for generating context-aware pageranks according to certain embodiments. For example, a method includes: generating a plurality of vector elements of a pagerank vector for a page based on a plurality of search contexts, each vector element of the plurality of vector elements corresponding to a respective search context, each search context of the plurality of search context corresponding to a respective security level of a plurality of security levels; obtaining one or more bleed factors for the plurality of search contexts, each bleed factor of the one or more bleed factors associated with two search contexts of the plurality of search contexts having two adjacent security levels of the plurality of security levels; and adjusting at least one vector element of the plurality of vector elements based on the one or more bleed factors.

20 Claims, 4 Drawing Sheets

400

SYSTEMS AND METHODS FOR GENERATING CONTEXT-AWARE PAGERANKS

CROSS REFERENCE TO RELATED APPLICATIONS

This application claims priority to U.S. Provisional Patent Application No. 63/314,667, filed Feb. 28, 2022, which is incorporated by reference herein for all purposes.

BACKGROUND

Pagerank is an algorithm used by search engine to rank web pages in search engine results. In some examples, pagerank is a way of measuring the importance or relevance of website pages. In certain examples, a pagerank of a page indicates a popularity or relevance to a search of the page. For example, a pagerank of a page is high if it has many inbound links and the pagerank is low if the page has few inbound links.

Hence it is highly desirable to improve the techniques for pagerank.

SUMMARY

Certain embodiments of the present invention are directed to computing platforms including one or more graph datastores, which may include pages and/or any of a variety of other content. More particularly, some embodiments of the present invention provide systems and methods for generating context-aware pageranks, for example for content of a graph datastore.

At least some aspects of the present disclosure are directed to a method for generating pageranks. The method comprising: generating a plurality of vector elements of a pagerank vector for a page based on a plurality of search contexts, each vector element of the plurality of vector elements corresponding to a respective search context, each search context of the plurality of search context corresponding to a respective security level of a plurality of security levels; obtaining one or more bleed factors for the plurality of search contexts, each bleed factor of the one or more bleed factors associated with two search contexts of the plurality of search contexts having two adjacent security levels of the plurality of security levels; and adjusting at least one vector element of the plurality of vector elements based on the one or more bleed factors.

At least some aspects of the present disclosure are directed to a system for generating pageranks. The system comprising: one or more memories comprising instructions stored thereon; and one or more processors configured to execute the instructions and perform operations comprising: generating a plurality of vector elements of a pagerank vector for a page based on a plurality of search contexts, each vector element of the plurality of vector elements corresponding to a respective search context, each search context of the plurality of search context corresponding to a respective security level of a plurality of security levels; obtaining one or more bleed factors for the plurality of search contexts, each bleed factor of the one or more bleed factors associated with two search contexts of the plurality of search contexts having two adjacent security levels of the plurality of security levels; and adjusting at least one vector element of the plurality of vector elements based on the one or more bleed factor.

Depending upon embodiment, one or more benefits may be achieved. These benefits and various additional objects, features and advantages of the present invention can be fully appreciated with reference to the detailed description and accompanying drawings that follow.

BRIEF DESCRIPTION OF THE DRAWINGS

The accompanying drawings are incorporated in and constitute a part of this specification and, together with the description, explain the features and principles of the disclosed embodiments. In the drawings.

DETAILED DESCRIPTION

Figure 1:
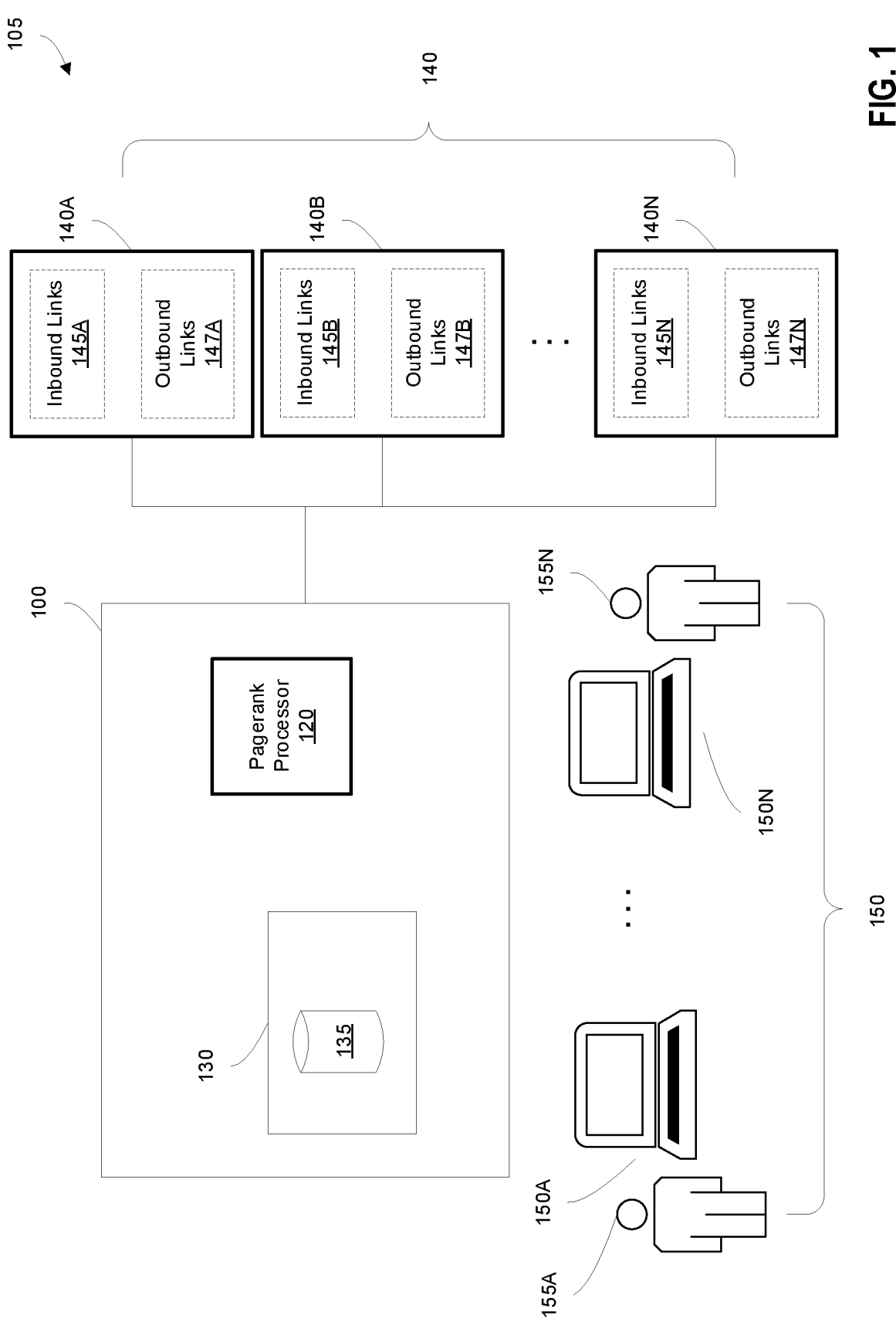
FIG. 1 depicts an illustrative system diagram of a context-aware pagerank and search environment, in accordance with certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

According to some embodiments, graph-based search relevance scores use the relevance of adjacent edges of a graph to distribute that relevance through the graph in an iterative manner, such that pages which link to other pages transfer their popularity via their links. In certain embodiments, implementations of these algorithms may create potentially large security leaks and inaccessible pages. For the example of two documents, a popular classified document which links to an unpopular unclassified document, using pagerank algorithm, the relevance of the unclassified document would contain information from the classified document, which may create a leak.

At least some embodiments of the present disclosure are directed to systems and methods using a secure pagerank algorithm, such that the algorithm is computed in secure compartments for a page and then a relevance score is aggregated, for example, to control security leak. In certain embodiments, links transfer relevance values, and then different relevance scores are applied to pages (e.g., documents) at the end. In some embodiments, at each iteration, the relevance scores are accumulated up the security chain on a page (e.g., a document) so that unclassified popularity boosts a document (and is then transferred via outbound links), but not otherwise.

According to certain embodiments, a bleed factor can be included to allow relevance value to bleed into lower context-level (e.g., lower security level) search sections. In some examples, for a bleed factor of 0, the relevance value does not bleed into lower context-level search sections. According to some embodiments, a secure pagerank algorithm runs at a fixed context level (e.g., a fixed security level) and all links are considered to be at the fixed context level for the duration of the run. In certain embodiments, a contextual pagerank algorithm can run iteratively at a standard context level with the output of one used as the input of another.

According to some embodiments, a contextual pagerank algorithm generates a pagerank vector for a page, where each vector element of a pagerank vector corresponds to a context level (e.g., a security level, a privacy level). In certain embodiments, the contextual pagerank algorithm generates an adjusted pagerank vector for a page, where each vector element of a pagerank vector is adjusted by a corresponding bleed factor. In some embodiments, a bleed factor corresponds to two adjacent context levels.

According to certain embodiments, a security-aware pagerank algorithm generates a pagerank vector, or referred to as a set of pageranks, for a page. In some embodiments, a vector element of a pagerank vector, or referred to as a pagerank element in the set of the pageranks, corresponds to a security level. In certain embodiments, the security-aware pagerank algorithm generates an adjusted pagerank vector for a page, where each vector element of a pagerank vector is adjusted by a corresponding bleed factor. In some embodiments, a bleed factor corresponds to two adjacent security levels (e.g., classified and unclassified, security level 3 and security level 2).

FIG. 1 depicts an illustrative system diagram of a context-aware pagerank and search environment 105, in accordance with certain embodiments of the present disclosure. FIG. 1 is merely an example. One of ordinary skill in the art would recognize many variations, alternatives, and modifications. According to certain embodiments, the security-aware pagerank environment 105 includes a context-aware pagerank system 100, a plurality of pages 140, and a plurality of user devices 150. As used herein, a page refers to a web page or a document that include one or more links to access one or more other pages and can be accessed by one or more other pages via one or more links. In some embodiments, the security-aware pagerank system 100 includes one or more pagerank processor 120 and one or more memories 130. Although the above has been shown using a selected group of components in the context-aware pagerank environment

105, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present disclosure.

According to certain embodiments, a context-aware pagerank system (e.g., the context-aware pagerank system 100 in FIG. 1) is configured to determine a pagerank vector for each page of the plurality of pages 140. In some embodiments, each page 140 (e.g., page 140A, page 140B, . . . page 140N) has one or more inbound links (e.g., links 145A, 145B, . . . 145N) and one or more outbound links (e.g., links 147A, 147B, . . . 147N). In certain embodiments, the pagerank vector includes a plurality of vector elements, where each vector element corresponds to a search context and/or a security level or context level of the search context. In some examples, the pagerank vector includes three or more vector elements, where each vector element corresponds to a search context and/or a security level or context level of the search context.

According to some embodiments, a vector element of a pagerank vector is adjusted based on a corresponding bleed factor. In certain embodiments, every adjacent context levels or security levels pair corresponds to a bleed factor. In some embodiments, the system uses a set of bleed factors having a number of bleed factor that is one less than the number of context levels (e.g., the number of security levels). For example, for a system with five context levels, the system may use a set of four bleed factors. According to certain embodiments, the set of bleed factors, or referred to as a bleed factor vector, are changed over iterations. For example, the set of bleed factors are decreasing over pagerank iterations. In some embodiments, a pagerank iteration refers to a pagerank computation to links moving up to its parent page or child page. In certain embodiments, the links are moved from immediate pages to its parent pages or child pages.

In some examples, each bleed factor of the set of bleed factors is a normalized number. In certain examples, each bleed factor of the set of bleed factors is a number between 0 and 1. In some cases, the conventional link-based ranking algorithms may cause security leak. For example, a link in a sensitive document to a unsensitive page may cause leaking information. In some embodiments, a security-aware page ranking system may use bleed factors to control the security leaks. In certain embodiments, a page (e.g., page 140A) is corresponding to a number of context levels or security levels. For example, page 140A is split into a classified page, an unclassified page.

According to certain embodiments, each vector element (e.g., a vector entry) of a pagerank vector is used or applied for a search with a corresponding context level or security level. In some embodiments, each vector element of a pagerank vector is computed and updated through a plurality of iterations at a same context level (e.g., vector element 1 for context 1). In certain embodiments, each vector element is computed based on adjusted value using a bleed factor, or referred to as a leak factor, through a plurality of iterations. In some embodiments, a vector element of a page in a lower context level or a lower security is continuously boosted through a plurality of iterations. In certain embodiments, the pagerank processor 120 is configured to obtain one or more bleed factors, where each bleed factor of the one or more bleed factors is associated with two search contexts of the plurality of search contexts having two adjacent context levels or security levels of the plurality of context levels or security levels.

According to certain embodiments, the pagerank processor 120 is configured to adjust the plurality of vector elements based on the one or more bleed factors. In some embodiments, the pagerank processor 120 is configured to determine whether the pagerank iterations has completed. In certain embodiments, if the pagerank iterations have not completed, the system goes back to continue the context-aware or security-aware pagerank steps. In some embodiments, if the pagerank iterations have completed, the context-aware pagerank system 100 or another component in the context-aware pagerank and search environment 105 is configured to receive a search in a user search context from a user device 150 (e.g., a user device 150A, . . . , 150N), where each user device is associated with a user (e.g., a user 155A, . . . , 155N). In certain embodiments, the pagerank system 100 or another component in the context-aware pagerank and search environment 105 is configured to identify a user security level associated with the user search context.

According to some embodiments, the context-aware pagerank system 100 or another component in the context-aware pagerank and search environment 105 is configured to determine a pagerank of the page for the search based on the user security level and the pagerank vector. In certain embodiments, the system 100 or another component in the context-aware pagerank and search environment 105 is configured to render the pagerank of the page in response to the search. In some embodiments, the page comprises a plurality of page content associated with the plurality of security levels. In certain embodiments, the pagerank system 100 or another component in the context-aware pagerank and search environment 105 is configured to receive a request of the page associated with the search. In some embodiments, the system 100 or another component in the context-aware pagerank and search environment 105 is configured to obtaining the page with a page content of the plurality of page content associated with the user security level. In certain embodiments, the pagerank system 100 or another component in the context-aware pagerank and search environment 105 is configured to render the page with the page content.

In some embodiments, the one or more memories 130 includes one or more data repositories 135, for example, to pages, pagerank vectors, bleed factors, and/or the like. The data repositories may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components of the context-aware pagerank system 100 and/or in the context-aware pagerank and search environment 105 can execute software or firmware stored in non-transitory computer-readable medium in the one or more memories 130 to implement various processing steps. Various components and processors of the system 100 and other components in the environment 105 can be implemented by one or more computing devices, including but not limited to, circuits, a computer, a cloud-based processing unit, a processor, a processing unit, a microprocessor, a mobile computing device, and/or a tablet computer. In some cases, various components in the context-aware pagerank and search environment 105 (e.g., the context-aware pagerank system 100, the one or more pagerank processors 120, the one or more user devices 150) can be implemented on a shared computing device. Alternatively, a component in the environment 105 and/or a component of the system 100 can be implemented on multiple computing devices. In some implementations, various modules and components of the system 100 and/or in the environment 105 can be implemented as software, hardware, firmware, or a combination thereof. In some cases, various components of the system 100 and/or in the environment 105 can be implemented in software or firmware executed by a computing device.

Various components of the context-aware pagerank system 100 and/or in the context-aware pagerank and search environment 105 can communicate via or be coupled to via a communication interface, for example, a wired or wireless interface. The communication interface includes, but not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2:
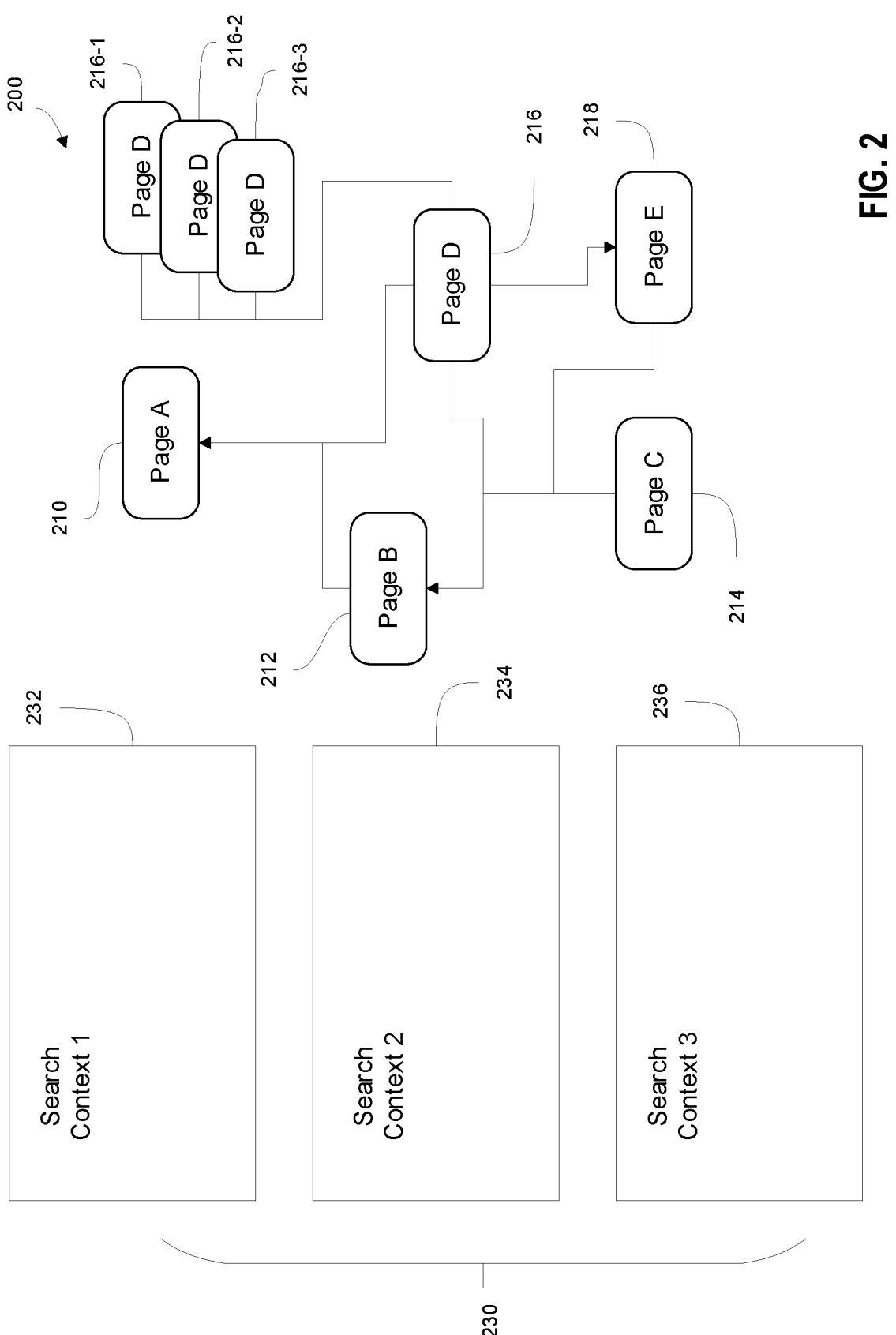
FIG. 2 is an illustrative example of a context-aware pagerank and search environment according to certain embodiments of the present disclosure.

FIG. 2 is an illustrative example of a context-aware pagerank and search environment 200 according to certain embodiments of the present disclosure. According to certain embodiments, the pagerank and search environment 200 includes a plurality of pages (e.g., page 210, page 212, page 214, page 216, page 218, etc.). According to some embodiments, the search environment includes a set of search contexts 230 (e.g., search context 232, search context 234, and search context 236). In certain embodiments, the search context is associated with one or more context parameters including, for example, a security level, a user role, a privilege level, and/or the like. In certain embodiments, one or more pages of the plurality of pages includes a page corresponding to a plurality of search contexts (e.g., search context 232, search context 234, and search context 236).

In some embodiments, a page has a plurality of page content, where each content is corresponding a search context. In certain embodiments, the plurality of page content is different from each other. In some embodiments, at least two of the plurality of page content are different from each other. In certain embodiments, at least two of the plurality of page content are the same. For example, the page 216 has page content 216-1, 216-2, 216-3, where each page content is corresponding to a search context (e.g., search context 232, search context 234, and search context 236). In certain embodiments, each page in the plurality of pages includes one or more inbound links and/or one or more outbound links. For example, page 210 has two inbound links from page 212 and page 215; and page 212 has three inbound links from page 214, page 216, and page 218. As an example, page 216 has three outbound links to page 210, page 212, and page 218.

According to certain embodiments, a context-aware pagerank system (e.g., the context-aware pagerank system 100 in FIG. 1) is configured to determine a pagerank vector for each page of the plurality of pages. In some embodiments, the pagerank vector includes a plurality of vector elements, where each vector element corresponds to a search context and/or a security level or context level of the search context. In certain examples, the pagerank vector includes three or more vector elements, where each vector element corresponds to a search context and/or a security level or context level of the search context.

According to some embodiments, a vector element of a pagerank vector is adjusted based on a corresponding bleed factor. In certain embodiments, every adjust context levels or security levels pair corresponds to a bleed factor. In some embodiments, the system uses a set of bleed factors having a number of bleed factor that is one less than the number of context levels (e.g., the number of security levels). For example, for a system with five context levels, the system may use a set of four bleed factors. According to certain embodiments, the set of bleed factors, or referred to as a bleed factor vector, are changed over iterations. For example, the set of bleed factors are decreasing over iterations.

In some examples, each bleed factor of the set of bleed factors is a normalized number. In certain examples, each bleed factor of the set of bleed factors is a number between 0 and 1. In certain embodiments, a vector element, or referred to as a pagerank for context-level or security level n, is adjusted by equation (1): Pagerank(n)(adjusted)=Pagerank(n)(original)+Pagerank(n+1)*Bleed-factor(n) (1), where Pagerank(n)(adjusted) is the adjusted pagerank for context level or security level (n), Pagerank(n)(original) is the computed pagerank for context level or security level (n) based on the inbound links, Pagerank(n+1) is the pagerank for context level or security level (n+1) (e.g., 1 level higher security classification than security level n), and Bleed-factor(n) is the bleed factor between the context level or security level (n+1) and the context level or security level (n).

In some cases, the conventional link-based ranking algorithms may cause security leak. For example, a link in a sensitive document to a unsensitive page may cause leaking information. In some embodiments, a security-aware page ranking system may use bleed factors to control the security leaks. In certain embodiments, a page (e.g., page 216) is corresponding to a number of context levels or security levels. For example, page 216 is split into a classified page, an unclassified page.

According to certain embodiments, each vector element (e.g., a vector entry) of a pagerank vector is used or applied for a search with a corresponding context level or security level. In some embodiments, each vector element of a pagerank vector is computed and updated through a plurality of iterations at a same context level (e.g., vector element 1 for context 1). In certain embodiments, each vector element is computed based on adjusted value using a bleed factor through a plurality of iterations. In some embodiments, a vector element of a page in a lower context level or a lower security is continuously boosted through a plurality of iterations.

Figure 3:
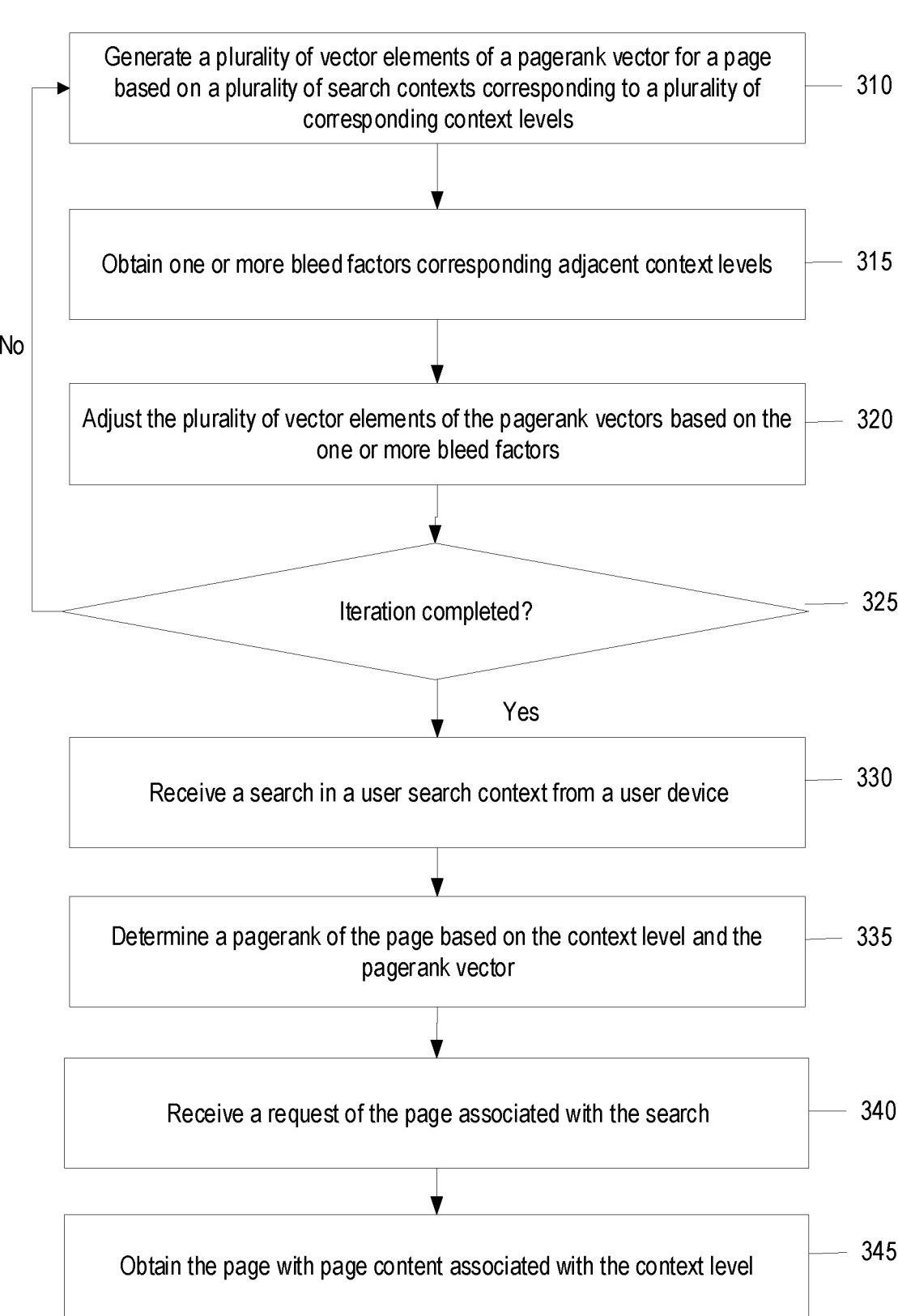
FIG. 3 is a simplified diagram showing a method for generating pageranks and search results according to certain embodiments of the present disclosure.

FIG. 3 is a simplified diagram showing a method 300 for generating pageranks and search results according to certain embodiments of the present disclosure. This diagram is merely an example. One of ordinary skill in the art would recognize many variations, alternatives, and modifications. The method 300 includes processes 310, 315, 320, 325, 330, 335, 340 and 345. Although the above has been shown using a selected group of processes for the method 300 for aspects described herein, there can be many alternatives, modifications, and variations. For example, some of the processes may be expanded and/or combined. Other processes may be inserted to those noted above. Depending upon the embodiment, the sequence of processes may be changed, and one or more processes may be replaced. Further details of these processes are found throughout the present disclosure.

According to some embodiments, at the process 310, a context-aware pagerank system (e.g., the context-aware pagerank system 100 in FIG. 1) is configured to generate a plurality of vector elements of a pagerank vector for a page based on a plurality of search contexts, where each vector element of the plurality of vector elements corresponds to a respective search context and each search context of the plurality of search context corresponds to a respective context level or security level of a plurality of context levels or security levels. In certain embodiments, at the process 315, the context-aware pagerank system is configured to obtain one or more bleed factors for the plurality of search contexts, where each bleed factor of the one or more bleed factors is associated with two search contexts of the plurality of search contexts having two adjacent context levels or security levels of the plurality of context levels or security levels.

According to certain embodiments, at the process 320, the context-aware pagerank system is configured to adjust the plurality of vector elements based on the one or more bleed factors. In some embodiments, at the process 325, the system is configured to determine whether the pagerank iterations has completed. In certain embodiments, if the pagerank iterations have not completed, the system goes back to the process 310 to continue the context-aware or security-aware pagerank steps. In some embodiments, if the pagerank iteration have completed, at the process 330, the system is configured to receive a search in a user search context from a user device. In certain embodiments, the system is configured to identify a user security level associated with the user search context.

According to some embodiments, at the process 335, the context-aware pagerank system is configured to determine a pagerank of the page for the search based on the user security level and the pagerank vector. In certain embodiments, the system is configured to render the pagerank of the page in response to the search. In some embodiments, the page comprises a plurality of page content associated with the plurality of security levels. In certain embodiments, at the process 340, the system is configured to receive a request of the page associated with the search. In some embodiments, at the process 345, the system is configured to obtaining the page with a page content of the plurality of page content associated with the user security level. In certain embodiments, the system is configured to render the page with the page content.

Figure 4:
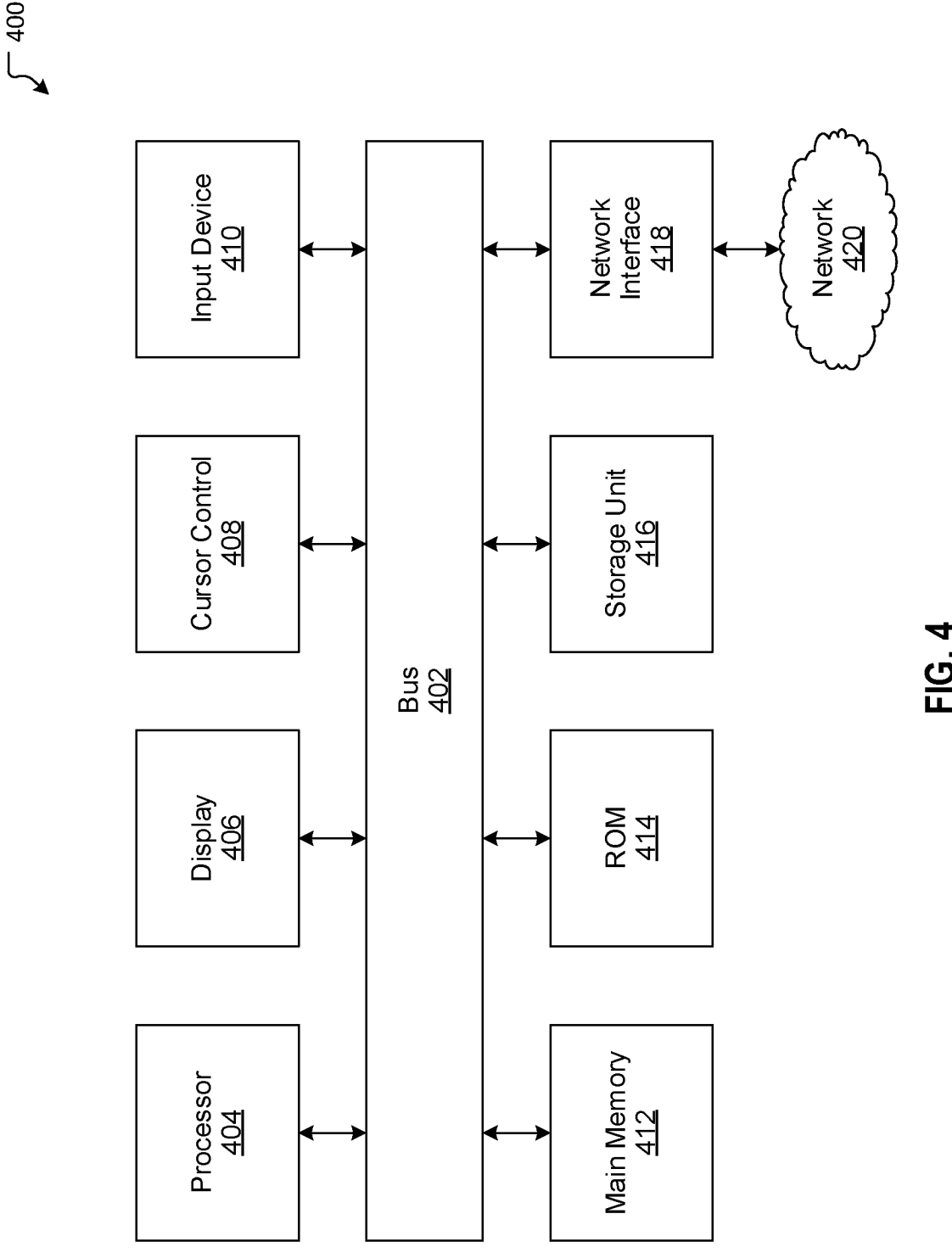
FIG. 4 is a simplified diagram showing a computing system for implementing a system for pagerank generation in accordance with at least one example set forth in the disclosure.

FIG. 4 is a simplified diagram showing a computing system for implementing a system 400 for pagerank generation in accordance with at least one example set forth in the disclosure. This diagram is merely an example, which should not unduly limit the scope of the claims. One of ordinary skill in the art would recognize many variations, alternatives, and modifications.

The computing system 400 includes a bus 402 or other communication mechanism for communicating information, a processor 404, a display 406, a cursor control component 408, an input device 410, a main memory 412, a read only memory (ROM) 414, a storage unit 416, and a network interface 418. In some embodiments, some or all processes (e.g., steps) of the method 300 are performed by the computing system 400. In some examples, the bus 402 is coupled to the processor 404, the display 406, the cursor control component 408, the input device 410, the main memory 412, the read only memory (ROM) 414, the storage unit 416, and/or the network interface 418. In certain examples, the network interface is coupled to a network 420. For example, the processor 404 includes one or more general purpose microprocessors. In some examples, the main memory 412 (e.g., random access memory (RAM), cache and/or other dynamic storage devices) is configured to store information and instructions to be executed by the processor 404. In certain examples, the main memory 412 is configured to store temporary variables or other intermediate information during execution of instructions to be executed by processor 404. For examples, the instructions, when stored in the storage unit 416 accessible to processor 404, render the computing system 400 into a special-purpose machine that is customized to perform the operations specified in the instructions. In some examples, the ROM 414 is configured to store static information and instructions for the processor 404. In certain examples, the storage unit 416 (e.g., a magnetic disk, optical disk, or flash drive) is configured to store information and instructions.

In some embodiments, the display 406 (e.g., a cathode ray tube (CRT), an LCD display, or a touch screen) is configured to display information to a user of the computing system 400. In some examples, the input device 410 (e.g., alphanumeric and other keys) is configured to communicate information and commands to the processor 404. For example, the cursor control component 408 (e.g., a mouse, a trackball, or cursor direction keys) is configured to communicate additional information and commands (e.g., to control cursor movements on the display 406) to the processor 404.

According to certain embodiments, a method for generating pagerank and search, comprising: generating a plurality of vector elements of a pagerank vector for a page based on a plurality of search contexts, each vector element of the plurality of vector elements corresponding to a respective search context, each search context of the plurality of search context corresponding to a respective security level of a plurality of security levels; obtaining one or more bleed factors for the plurality of search contexts, each bleed factor of the one or more bleed factors associated with two search contexts of the plurality of search contexts having two adjacent security levels of the plurality of security levels; and adjusting at least one vector element of the plurality of vector elements based on the one or more bleed factors; wherein the method is performed using one or more processors. For example, the method for generating pagerank and search is implemented according to at least FIG. 1, FIG. 2, and/or FIG. 3.

In some embodiments, the method further includes the step of receiving a search in a user search context from a user device; identifying a user security level associated with the user search context; and determining a pagerank of the page for the search based on the user security level and the pagerank vector. In certain embodiments, the method further includes the step of: rendering the pagerank of the page in response to the search. In some embodiments, the page comprises a plurality of page content associated with the plurality of security levels, and the method further includes the steps of: receiving a request of the page associated with the search; and obtaining the page with a page content of the plurality of page content associated with the user security level. In some embodiments, the page includes: first content that is classified and has a first security level; and second content that is unclassified and has a second security level. In certain embodiments, adjusting the at least one vector element based on the one or more bleed factors comprises: adjusting a first vector element based on a bleed factor of the one or more bleed factors that corresponds to the first classification level and the second classification level. In some embodiments, the bleed factor is a first bleed factor; the page includes third content having a third security level that is different than the first content and the second content; and adjusting the at least one vector element based on the one or more bleed factors further comprises: adjusting a second vector element based on a second bleed factor of the one or more bleed factors that corresponds to the third security level. In certain embodiments, the second bleed factor further corresponds to a security level that is adjacent to the third security level. In some embodiments, the security level that is adjacent to the third security level is the first security level or the second security level. In certain embodiments, the page includes an outbound link to another page.

According to certain embodiments, a system for generating pagerank and search comprising one or more memories comprising instructions stored thereon; and one or more processors configured to execute the instructions and perform operations comprising: generating a plurality of vector elements of a pagerank vector for a page based on a plurality of search contexts, each vector element of the plurality of vector elements corresponding to a respective search context, each search context of the plurality of search context corresponding to a respective security level of a plurality of security levels; obtaining one or more bleed factors for the plurality of search contexts, each bleed factor of the one or more bleed factors associated with two search contexts of the plurality of search contexts having two adjacent security levels of the plurality of security levels; and adjusting at least one vector element of the plurality of vector elements based on the one or more bleed factor. For example, the system for generating pagerank and search is implemented according to at least FIG. 1, FIG. 2, and/or FIG. 3.

In some embodiments, the operations further include the step of receiving a search in a user search context from a user device; identifying a user security level associated with the user search context; and determining a pagerank of the page for the search based on the user security level and the pagerank vector. In certain embodiments, the operations further include the step of: rendering the pagerank of the page in response to the search. In some embodiments, the page comprises a plurality of page content associated with the plurality of security levels, and the operations further include the steps of: receiving a request of the page associated with the search; and obtaining the page with a page content of the plurality of page content associated with the user security level. In certain embodiments, the page includes: first content that is classified and has a first security level; and second content that is unclassified and has a second security level. In some embodiments, adjusting the at least one vector element based on the one or more bleed factors comprises: adjusting a first vector element based on a bleed factor of the one or more bleed factors that corresponds to the first classification level and the second classification level. In certain embodiments, the bleed factor is a first bleed factor; the page includes third content having a third security level that is different than the first content and the second content; and adjusting the at least one vector element based on the one or more bleed factors further comprises: adjusting a second vector element based on a second bleed factor of the one or more bleed factors that corresponds to the third security level. In some embodiments, the second bleed factor further corresponds to a security level that is adjacent to the third security level. In certain embodiments, the security level that is adjacent to the third security level is the first security level or the second security level. In some embodiments, the page includes an outbound link to another page.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a sub-routine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method comprising:
   generating a plurality of vector elements of a pagerank vector for a page based on a plurality of search contexts, each vector element of the plurality of vector elements corresponding to a respective search context, each search context of the plurality of search context corresponding to a respective security level of a plurality of security levels, a security level of a search context indicating a criterion requiring a user having a user security level equal to or higher than the security level to access the search context;

obtaining one or more bleed factors for the plurality of search contexts, each bleed factor of the one or more bleed factors associated with two search contexts of the plurality of search contexts having two adjacent security levels of the plurality of security levels; and adjusting at least one vector element of the plurality of vector elements based on the one or more bleed factors by boosting a lower security level of the two adjacent security levels using a higher security level of the two adjacent security levels and at least one of the one or more bleed factors;

wherein the method is performed using one or more processors.

2. The method of claim 1, further comprising:

receiving a search in a user search context from a user device;

identifying a user security level associated with the user search context; and determining a pagerank of the page for the search based on the user security level and the pagerank vector.

3. The method of claim 2, further comprising:

rendering the pagerank of the page in response to the search.

4. The method of claim 2, wherein the page comprises a plurality of page content associated with the plurality of security levels, the method further comprising:

receiving a request of the page associated with the search; and obtaining the page with a page content of the plurality of page content associated with the user security level.

5. The method of claim 1, wherein the page includes:

first content that is classified and has a first security level; and second content that is unclassified and has a second security level.

6. The method of claim 5, wherein adjusting the at least one vector element based on the one or more bleed factors comprises:

adjusting a first vector element based on a bleed factor of the one or more bleed factors that corresponds to the first classification level and the second classification level.

7. The method of claim 6, wherein:

the bleed factor is a first bleed factor;

the page includes third content having a third security level that is different than the first content and the second content; and adjusting the at least one vector element based on the one or more bleed factors further comprises:

adjusting a second vector element based on a second bleed factor of the one or more bleed factors that corresponds to the third security level.

8. The method of claim 7, wherein the second bleed factor further corresponds to a security level that is adjacent to the third security level.

9. The method of claim 8, wherein the security level that is adjacent to the third security level is the first security level or the second security level.

10. The method of claim 1, wherein the page includes an outbound link to another page.

11. A system comprising:

one or more memories comprising instructions stored thereon; and one or more processors configured to execute the instructions and perform operations comprising:

generating a plurality of vector elements of a pagerank vector for a page based on a plurality of search contexts, each vector element of the plurality of vector elements corresponding to a respective search context, each search context of the plurality of search context corresponding to a respective security level of a plurality of security levels, a security level of a search context indicating a criterion requiring a user having a user security level equal to or higher than the security level to access the search context;

obtaining one or more bleed factors for the plurality of search contexts, each bleed factor of the one or more bleed factors associated with two search contexts of the plurality of search contexts having two adjacent security levels of the plurality of security levels; and adjusting at least one vector element of the plurality of vector elements based on the one or more bleed factors by boosting a lower security level of the two adjacent security levels using a higher security level of the two adjacent security levels and at least one of the one or more bleed factors.

12. The system of claim 11, wherein the operations further comprise:

receiving a search in a user search context from a user device;

identifying a user security level associated with the user search context; and determining a pagerank of the page for the search based on the user security level and the pagerank vector.

13. The system of claim 12, wherein the operations further comprise:

rendering the pagerank of the page in response to the search.

14. The system of claim 12, wherein the page comprises a plurality of page content associated with the plurality of security levels, wherein the operations further comprise:

receiving a request of the page associated with the search; and obtaining the page with a page content of the plurality of page content associated with the user security level.

15. The system of claim 11, wherein the page includes:

first content that is classified and has a first security level; and second content that is unclassified and has a second security level.

16. The system of claim 15, wherein adjusting the at least one vector element based on the one or more bleed factors comprises:

adjusting a first vector element based on a bleed factor of the one or more bleed factors that corresponds to the first classification level and the second classification level.

17. The system of claim 16, wherein:

the bleed factor is a first bleed factor;

the page includes third content having a third security level that is different than the first content and the second content; and adjusting the at least one vector element based on the one or more bleed factors further comprises:

adjusting a second vector element based on a second bleed factor of the one or more bleed factors that corresponds to the third security level.

18. The system of claim 17, wherein the second bleed factor further corresponds to a security level that is adjacent to the third security level.

19. The system of claim 18, wherein the security level that is adjacent to the third security level is the first security level or the second security level.

20. The system of claim 11, wherein the page includes an outbound link to another page.

\* \* \* \* \*